(12) United States Patent
Lu

(10) Patent No.: US 10,055,365 B2
(45) Date of Patent: Aug. 21, 2018

(54) SHARED BUFFER ARBITRATION FOR PACKET-BASED SWITCHING

(71) Applicant: MediaTek Inc., Hsinchu (TW)

(72) Inventor: Kuo-Cheng Lu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 302 days.

(21) Appl. No.: 15/135,479

(22) Filed: Apr. 21, 2016

(65) Prior Publication Data

US 2016/0239439 A1    Aug. 18, 2016

Related U.S. Application Data

(60) Provisional application No. 62/196,325, filed on Jul. 24, 2015.

(51) Int. Cl.
| | |
|---|---|
| *H04L 12/28* | (2006.01) |
| *H04L 12/56* | (2006.01) |
| *G06F 13/16* | (2006.01) |
| *H04L 5/22* | (2006.01) |
| *H04L 12/861* | (2013.01) |

(52) U.S. Cl.
CPC ...... *G06F 13/1647* (2013.01); *G06F 13/1663* (2013.01); *H04L 5/22* (2013.01); *H04L 49/9036* (2013.01); *Y02D 10/14* (2018.01)

(58) Field of Classification Search
None
See application file for complete search history.

(56) References Cited

U.S. PATENT DOCUMENTS

| | | | | |
|---|---|---|---|---|
| 2006/0221945 A1* | 10/2006 | Chin | ................. | H04L 49/103 370/381 |
| 2007/0121499 A1* | 5/2007 | Pal | .................... | H04L 45/60 370/230 |
| 2014/0082118 A1* | 3/2014 | Chan | ................. | G06F 15/167 709/212 |
| 2014/0177324 A1* | 6/2014 | Liu | ..................... | G11C 8/16 365/154 |

\* cited by examiner

*Primary Examiner* — Rebecca E Song
(74) *Attorney, Agent, or Firm* — Han IP Corporation; Andy M. Han

(57) ABSTRACT

Methods and apparatuses regarding shared buffer arbitration for packet-based switching are described. A data packet may be received by a packet buffer including a first plurality of banks of memory units and a second plurality of banks of memory units. Each memory unit may store one cell of data and accommodate one access operation in one clock cycle. In an event that the data packet includes at least two cells of data, the at least two cells of the data packet may be alternately written into at least one memory unit in the first plurality of banks of memory units and at least one memory unit in the second plurality of banks of memory units. Cells of data packets may be read from the first plurality of banks of memory units and the second plurality of banks of memory units according to a time-division multiplexing (TDM) scheme.

20 Claims, 7 Drawing Sheets

SHARED BUFFER ARBITRATION FOR PACKET-BASED SWITCHING

CROSS REFERENCE TO RELATED PATENT APPLICATIONS

The present disclosure claims the priority benefit of U.S. Patent Application No. 62/196,325, filed on 24 Jul. 2015, which is incorporated by reference in its entirety.

TECHNICAL FIELD

The present disclosure is generally related to data communications and, more particularly, to methods, devices and apparatuses pertaining to shared buffer arbitration for packet-based switching.

BACKGROUND

Unless otherwise indicated herein, approaches described in this section are not prior art to the claims listed below and are not admitted to be prior art by inclusion in this section.

In high-speed packet switch design, ultra-high memory bandwidth is typically one of the most critical requirements for shared-buffer packet switches. To provide enough bandwidth for read and write operations, expensive multiple-port memory is commonly used to implement packet buffer. Conventional approaches use expensive multiple-port memory (e.g., two-write/two-read (2W2R) memory, two read-write (2RW) memory or four read-write (4RW) memory) or algorithmic memory to implement a high-speed packet buffer.

One example of an existing approach is shown in FIG. 6, which illustrates a packet buffer 600 of a two-port packet switch. The packet buffer 600 is built with a two-read/two-write (2R2W) memory capable of supporting two read (2R) operations and two write (2W) operations in the same clock cycle. Another example of an existing approach is shown in FIG. 7, which illustrates a packet buffer 700 of a two-port packet switch. The packet buffer 700 is built with multiple banks of 2RW memory units. Each of the 2RW memory unit is capable of supporting one of the following: two read operations in the same clock cycle, two write operations in the same clock cycle, or one read operation and one write operation in the same clock cycle. For write operations, the buffer management of packet buffer 700 allocates the memory banks with free cells and their read/write ports are not fully used (e.g., 2R or 1R+1W) in the same clock cycle. For example, when a first read port (TX0) is reading the first memory bank and a second read port (TX1) is reading the second memory bank, the buffer management may allocate a free cell from the first memory bank to a first write port (RX0) and allocate a free cell from the second memory bank to a second write port (RX1). When both TX0 and TX1 are reading the first bank, the buffer management may allocate a free cell from the second memory bank to RX0 and allocate a free cell from the third memory bank to RX1.

Nevertheless, conventional approaches such as those associated with packet buffer 600 and packet buffer 700 utilize expensive memory with relatively larger transistor counts per memory bit cell. Accordingly, drawbacks of these approaches include high cost and high power consumption due to larger transistor counts per memory bit cell.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide a shared buffer arbitration technique that can resolve multiple-read-port static random-access memory (SRAM) requirement for high-speed packet switches. Implementations in accordance with the present disclosure provide techniques, methods, devices and apparatuses to emulate a memory with multiple read/write ports using smaller read/write port-count memory elements. Utilizing implementations of the present disclosure, one can build a packet switch with significant cost and power reduction.

In one aspect, a method may involve receiving a data packet by a packet buffer. The packet buffer may include a first plurality of banks of memory units and a second plurality of banks of memory units. Each memory unit may be configured to store one cell of data and accommodate one access operation (e.g., one read operation or one write operation) in one clock cycle. The method may also involve, in an event that the data packet comprises at least two cells of data, alternately writing the at least two cells of the data packet into at least one memory unit in the first plurality of banks of memory units and at least one memory unit in the second plurality of banks of memory units. The method may further involve reading from the first plurality of banks of memory units and the second plurality of banks of memory units according to a time-division multiplexing (TDM) scheme.

In another aspect, an apparatus may include a packet buffer. The packet buffer may include a first plurality of banks of memory units, a second plurality of banks of memory units, a plurality of write ports, a plurality of read ports, and a management circuit. Each memory unit of the first plurality of banks may be configured to store one cell of data and accommodate one access operation (e.g., one read operation or one write operation) in one clock cycle. Each memory unit of the second plurality of banks may be configured to store one cell of data and accommodate one access operation (e.g., one read operation or one write operation) in one clock cycle. The management circuit may be configured to manage operations of the plurality of write ports and the plurality of read ports. In an event that a data packet to be stored includes at least two cells of data, the management circuit may be configured to control the plurality of write ports to alternately write the at least two cells of the data packet into at least one respective memory unit in the first plurality of banks of memory units and at least one respective memory unit in the second plurality of banks of memory units. The management circuit may be also configured to control the plurality of read ports to read from the first plurality of banks of memory units and the second plurality of banks of memory units according to a TDM scheme.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Overview

Figure 1:
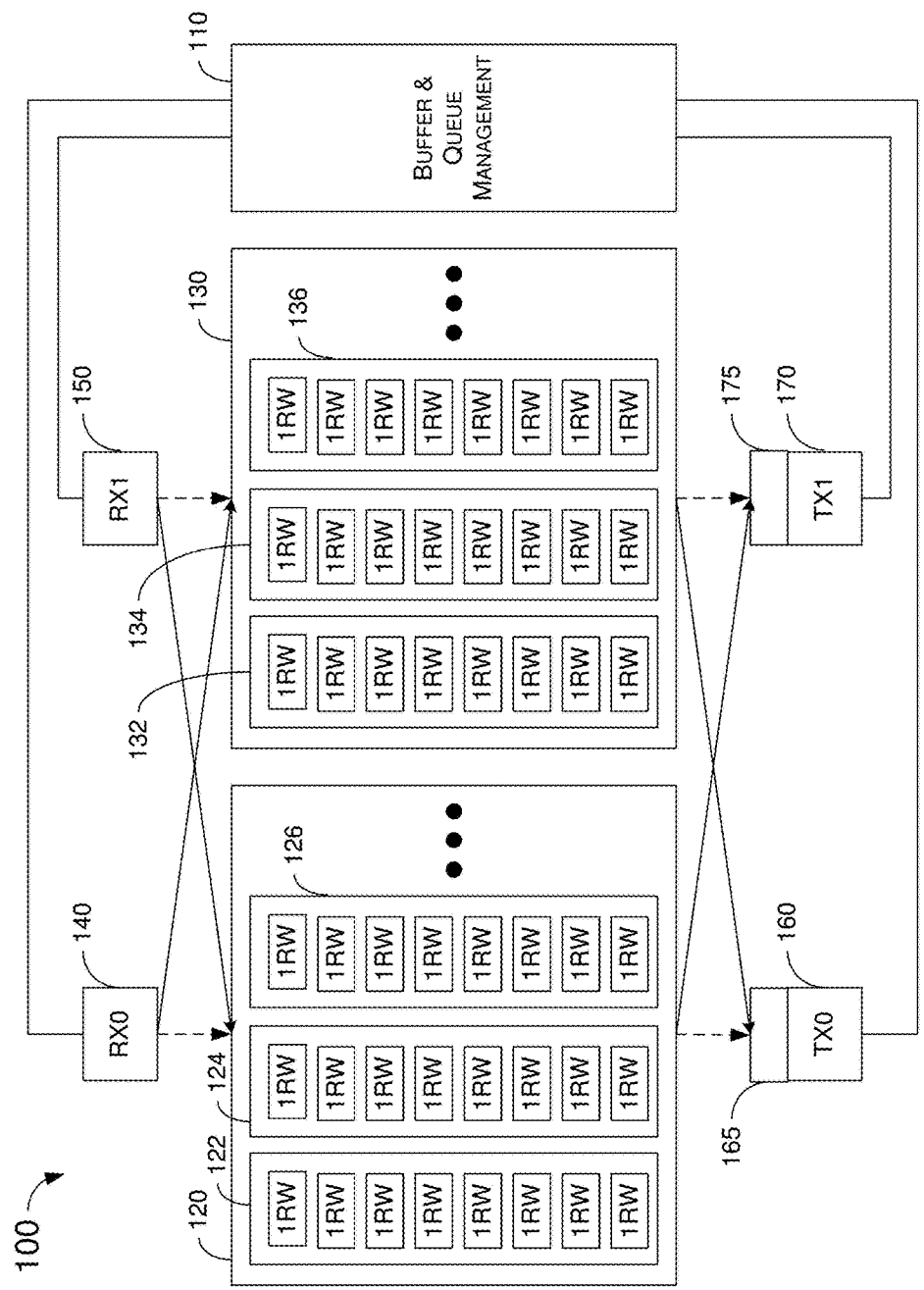
FIG. 1 is a block diagram of a conceptual packet buffer in accordance with the present disclosure.

Generally, a packet is a variable length frame. For Ethernet, the length of a packet is typically between 64 bytes (or 64 B) and 1518 bytes (or 1518 B). Typically, every two consecutive packets in transmission are separated by a certain amount of gap. For Ethernet, this packet gap is typically 20 B, including 12 B of inter-frame gap and 8 B of preamble. A packet is normally segmented into fixed-size cells before being stored into a packet buffer in a packet switch as one or more cells. The cell size is normally bigger than the shortest packet size, i.e., 64 B for Ethernet. An example cell size may be 168 B. Moreover, a packet buffer is managed using a cell link list. Conceptually, a two-port packet switch needs a packet buffer with two write ports for two receiving (RX) ports and two read ports for transmission (TX) ports. To maintain wire-speed performance for the shortest packets, the packet buffer needs to allow a RX port to write a minimum packet, e.g., having a size of 64 B, every minimum packet time including a packet gap. For 100-Gigahertz (100 G) Ethernet, the minimum packet time is 6.72 nanoseconds (ns) (=(64+20 bytes)*8 bit-per-byte/100 Gbps). If the bandwidth of the packet buffer is allocated by an arbitration schemed such as a fixed TDM scheme (e.g., allocating a 168 B cell write bandwidth every 6.72 ns), the offered write bandwidth is actually 168 B (cell size)/6.72 ns=200 Gbps per 100 G Ethernet RX port. In this case it can be said that the packet memory speed-up factor is 2.

Given the aforementioned speed-up factor, for a packet with length greater than two cells even if a port misses a TDM time slot for some reason, the packet memory still can provide enough bandwidth to sustain a wire-speed performance. For example, a 337 B packet (3 cells) will take 28.65 ns (=(337+20 bytes)*8 bit-per-byte/100 Gbps) to enter the packet switch. If a port misses a TDM time slot and spent four time slots to write the packet to the packet buffer, there is still no overflow issue as four time slots may still be smaller than the packet time (i.e., 4*6.72 ns=26.88 ns which is less than 28.65 ns).

FIG. 1 illustrates a conceptual packet buffer 100 in accordance with the present disclosure. Conceptual packet buffer 100 is provided to illustrate various concepts of the present disclosure. Referring to FIG. 1, conceptual packet buffer 100 may include a buffer and queue management circuit 110, an odd-numbered rank (first rank) 120 of multiple memory banks of memory units, an even-numbered (second rank) 130 of multiple memory banks of memory units, a first write port (RX0) 140, a second write port (RX1) 150, a first read port (TX0) 160 and a second read port (TX1) 170. Buffer and queue management circuit 110 may be configured to control the operations of first write port 140, second write port 150, first read port 160 and second read port 170.

First rank 120 of multiple memory banks of memory units may include, for example, at least a first memory bank 122, a second memory bank 124 and a third memory bank 126. Second rank 130 multiple memory banks of memory units may include, for example, at least a first memory bank 132, a second memory bank 134 and a third memory bank 136. Each of the memory banks 122, 124, 126, 132, 134 and 136 may respectively include a number of one read-write (1RW) memory units, each of which capable of supporting one access operation (e.g., one read operation or one write operation) in a given clock cycle. Thus, conceptual packet buffer 100 is built with multiple memory banks of 1RW memory units that are arranged or otherwise partitioned into two ranks (e.g., first rank 120 and second rank 130) of multiple memory banks (e.g., first memory bank 122, second memory bank 124, third memory bank 126, first memory bank 132, second memory bank 134 and third memory bank 136).

In conceptual packet buffer 100, buffer and queue management circuit 110 may manage operations of the write ports 140 and 150 and the read ports 160 and 170. Specifically, buffer and queue management circuit 100 may control the write ports 140 and 150 to alternately write at least two cells of a data packet into at least one respective memory unit in the first rank 120 of memory units and at least one respective memory unit in the second rank 130 of memory units. Buffer and queue management circuit 110 may control the read ports 160 and 170 to read from the first rank 120 of memory units and the second rank 130 of memory units according to a TDM scheme.

Buffer and queue management circuit 110 may control the write ports 140 and 150 to write the data packet as a plurality of cells of data comprising at least one odd-numbered cell and at least one even-numbered cell by performing a number of operations. For instance, buffer and queue management circuit 110 may write each odd-numbered cell of the data packet into a respective memory cell of the first rank 120 of memory units, and write each even-numbered cell of the data packet into a respective memory cell of the second rank 130 of memory units. In writing each odd-numbered cell of the data packet into the respective memory cell of the first rank 120 of memory units and in writing each even-numbered cell of the data packet into the respective memory cell of the second rank 130 of memory units, buffer and queue management circuit 110 may control the write ports 140 and 150 to write an odd-numbered cell of the data packet into a respective memory cell of the first rank 120 of memory units before writing an even-numbered cell of the data packet into a respective memory cell of the second rank 130 of memory units.

In reading from the first rank 120 of memory units and the second rank 130 of memory units according to a TDM scheme, buffer and queue management circuit 110 may perform a number of operations. For instance, buffer and queue management circuit 110 may assign first read port 160 to alternately read the first rank 120 and the second rank 130 of memory units starting from a respective memory unit of the first rank 120 of memory units. Buffer and queue management circuit 110 may also assign second read port 170 to alternately read the first rank 120 and the second rank 130 of memory units starting from a respective memory unit of the second rank 130 of memory units. In assigning first read port 160 to alternately read the first rank 120 and the second rank 130 of memory units, buffer and queue management circuit 110 may provide first read port 160 with a first pointer pointed to the first rank 120 of memory units and a second pointer pointed to the second rank 130 of memory units. In assigning second read port 170 to alternately read the first rank 120 and the second rank 130 of memory units, buffer and queue management circuit 110 may provide second read port 170 with a third pointer pointed to the first rank 120 of memory units and a fourth pointer pointed to the second rank 130 of memory units.

In reading from the first rank 120 of memory units and the second rank 130 of memory units according to a TDM scheme, buffer and queue management circuit 110 may control the read ports 160 and 170 to perform a number of operations. For instance, in an event that a data packet to be read comprises at least two cells of data, buffer and queue management circuit 110 may perform the following operations: reading an even-numbered cell of data in a first clock cycle; reading an odd-numbered cell of data in a second clock cycle after the first clock cycle; and performing one-cell reordering to output the odd-numbered cell and the even-numbered cell in sequence. In performing the one-cell reordering, the read ports 160 and 170 may perform a number of operations including, for example, buffering the even-numbered cell of data; transmitting the odd-numbered cell of data in a third clock cycle; and transmitting the even-numbered cell of data in a fourth clock cycle after the third clock cycle.

In reading from the first rank 120 of memory units and the second rank 130 of memory units according to a TDM scheme, buffer and queue management circuit 110 may perform a number of operations. For instance, buffer and queue management circuit 110 may assign first read port 160 to alternately read the first rank 120 and the second rank 130 of memory units starting from a respective memory unit of the first rank 120 of memory units. Moreover, buffer and queue management circuit 110 may assign second read port 170 to alternately read the first rank 120 and the second rank 130 of memory units starting from a respective memory unit of the second rank 130 of memory units. In assigning first read port 160 to alternately read the first rank 120 and the second rank 130 of memory units, buffer and queue management circuit 110 may provide first read port 160 with a first pointer pointed to the first rank 120 of memory units and a second pointer pointed to the second rank 130 of memory units. In assigning second read port 170 to alternately read the first rank 120 and the second rank 130 of memory units, buffer and queue management circuit 110 may provide second read port 170 with a third pointer pointed to the first rank 120 of memory units and a fourth pointer pointed to the second rank 130 of memory units.

In an event that the data packet comprises no more than one cell of data, buffer and queue management circuit 110 may control the write ports 140 and 150 to write the data packet as one cell of data into a first memory cell of the first rank 120 of memory units and into a second memory cell of the second rank 130 of memory units. In writing the data packet as one cell into the first memory cell of the first rank 120 of memory units and into the second memory cell of the second plurality of banks of memory units, the write ports 140 and 150 may write the data packet into the respective memory cell of the first rank 120 of memory units and into the respective memory cell of the second rank 130 of memory units in one clock cycle. Moreover, buffer and queue management circuit 110 may control the read ports 160 and 170 to read the one cell of data of the data packet which comprises no more than one cell of data from either the first memory unit or the second memory unit and transmit the data packet.

In view of the above, first write port 140 and second write port 150 may write an odd-numbered cell of a data packet (e.g., the first cell, the third cell, the fifth cell, the seventh cell and so on) into the odd-numbered rank or first rank 120, and write an even-numbered cell of the data packet (e.g., the second cell, the fourth cell, the sixth cell, the eighth cell and so on) into the even-numbered rank or second rank 130. Additionally, first write port 140 and second write port 150 may write an odd-numbered cell of a data packet into the odd-numbered rank or first rank 120 first before writing an even-numbered cell of the data packet into the even-numbered rank or second rank 130. Moreover, first read port 160 and second read port 170 may read from the two ranks, first rank 120 and second rank 130, in accordance with an arbitration scheme based on TDM. Additionally, first read port 160 may be accommodated or otherwise provided with a reordering mechanism 165. Likewise, second read port 170 may be accommodated or otherwise provided with a reordering mechanism 175. Reordering mechanisms 165 and 175 may assist first read port 160 and second read port 170 in providing multiple cells of a data packet in sequence (e.g., providing a first cell of the data packet before providing a second cell of the data packet, and providing the second cell of the data packet before providing a third cell of the data packet, and so on).

Advantageously, in implementations in accordance with the present disclosure, both the die size and power consumption can be reduced by emulating a multiple-read/write port memory using less read/write port count memory elements, e.g., 1RW memory units, for packet buffer application. In contrast, conventional approaches tend to result in high cost and high power consumption due to large transistor counts per memory bit cell.

EXAMPLE IMPLEMENTATIONS

Figure 2:
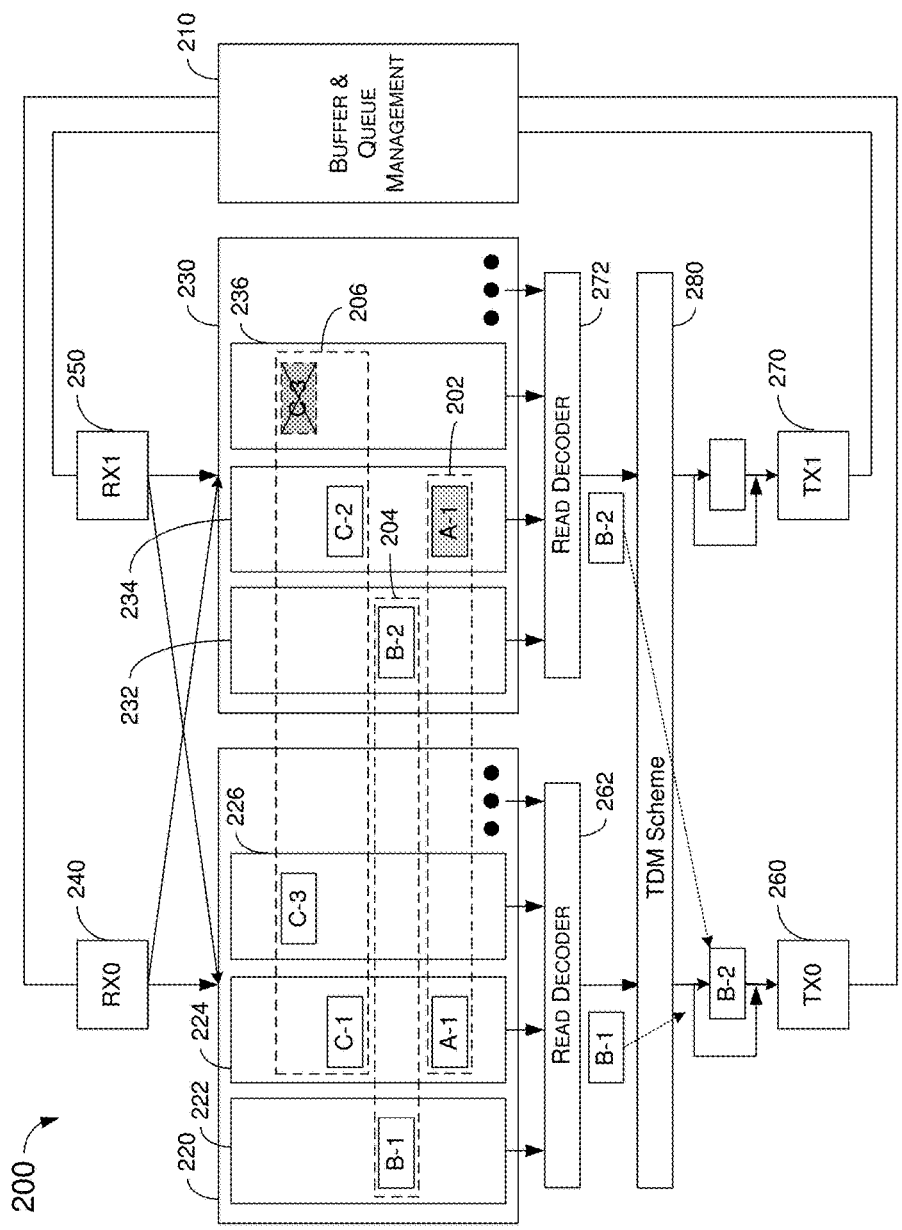
FIG. 2 is a block diagram of an example packet buffer in accordance with an implementation of the present disclosure.

FIG. 2 illustrates an example packet buffer 200 in accordance with an implementation of the present disclosure. Example packet buffer 200 may include a buffer and queue management circuit 210, an odd-numbered rank (first rank) 220 of multiple memory banks of memory units, an even-numbered (second rank) 230 of multiple memory banks of memory units, a first write port (RX0) 240, a second write port (RX1) 250, a first read port (TX0) 260, a second read port (TX1) 270, an odd-numbered read decoder (first read decoder) 262, and an even-numbered read decoder (second read decoder) 272. Buffer and queue management circuit 210 may be configured to control the operations of first write port 240, second write port 250, first read port 260 and second read port 270.

First rank 220 of multiple memory banks of memory units may include, for example, at least a first memory bank 222, a second memory bank 224 and a third memory bank 226. Second rank 230 multiple memory banks of memory units may include, for example, at least a first memory bank 232, a second memory bank 234 and a third memory bank 236. Each of the memory banks 222, 224, 226, 232, 234 and 236 may respectively include a number of 1RW memory units (not shown to avoid obscuring FIG. 2), each of which capable of supporting one access operation (e.g., one read operation or one write operation) in a given clock cycle. First read decoder 262 may be associated with first rank 220 to issue read requests to first rank 220, and second read decoder 272 may be associated with second rank 230 to issue read requests to second rank 230. Thus, example packet buffer 200 is built with multiple memory banks of 1RW memory units that are arranged or otherwise partitioned into two ranks (e.g., first rank 220 and second rank 230) of multiple memory banks (e.g., first memory bank 222, second memory bank 224, third memory bank 226, first memory bank 232, second memory bank 234 and third memory bank 236).

In example packet buffer 200, first write port 240 and second write port 250 may write a cell of a data packet into the odd-numbered rank or first rank 220 first before writing another cell of the data packet into the even-numbered rank or second rank 230. Moreover, first read port 260 and second read port 270 may read from the two ranks, first rank 220 and second rank 230, in accordance with a TDM scheme 280.

For each of first write port 240 and second write port 250, buffer and queue management circuit 210 may allocate free cells periodically, e.g., by allocating a cell from first rank 220 first and then allocating a cell from second rank 230, for every incoming data packet. A memory bank selection mechanism utilized in example packet buffer 200 may be, for example, to select the memory bank without any read/write port conflict. In writing cells of a data packet, buffer and queue management circuit 210 may direct either first write port 240 or second write port 250 to write an odd-numbered cell of the data packet (e.g., the first cell, the third cell, the fifth cell, the seventh cell and so on) into first rank 220, and write an even-numbered cell of the data packet (e.g., the second cell, the fourth cell, the sixth cell, the eighth cell and so on) into second rank 230. Additionally, buffer and queue management circuit 210 may direct either first write port 240 or second write port 250 to write an odd-numbered cell of a data packet into first rank 220 first before writing an even-numbered cell of the data packet into second rank 230.

First read port 260 and second read port 270 may read cells from first rank 220 and second rank 230 separately according to TDM scheme 280. For instance, when first read port 260 is assigned by buffer and queue management circuit 210 to read a cell from first rank 220, second read port 270 may be assigned by buffer and queue management circuit 210 to read a cell from second rank 230. Each of first read port 260 and second read port 270 may be provided with two cell pointers (e.g., one pointed to first rank 220 rank and the other pointed to second rank 230) from buffer and queue management circuit 210 at a time. Each of first read decoder 262 and second read decoder 272 may issue a read request to first rank 220 or second rank 230, respectively, based on the cell pointer from a respective read port to read a cell for every cell time slot. Each of first read port 260 and second read port 270 may then issue a related read request to the rank 220 or 230 currently assigned according to TDM scheme 280. For example, first read port 260 or second read port 270 may read an even-numbered cell from second rank 230 when such read port is assigned to read the second rank 230 according to TDM scheme 280.

According to TDM scheme 280, first read port 260 may alternately read from first rank 220 and second rank 230 starting with first rank 220, and second read port 270 may alternately read from first rank 220 and second rank 230 starting with second rank 230. Alternately, according to TDM scheme 280, first read port 260 may alternately read from first rank 220 and second rank 230 starting with second rank 230, and second read port 270 may alternately read from first rank 220 and second rank 230 starting with first rank 220.

In some instances, TDM sequence may not always align with packet sequence (e.g., first rank 220→second rank 230→first rank 220→second rank 230→ . . . ), a read port may perform one-cell reordering in the event that the read port reads an even-numbered cell first before reading an odd-numbered cell of the same packet. In the example shown in FIG. 2, first read port 260 may read a B-2 cell of a data packet 204 (which includes a cell B-1 and cell B-2) from second rank 230 first. As a result, first read port 260 may buffer cell B-2 until first read port 260 reads cell B-1 from first rank 220 during the next clock cycle so as to transmit the cells in sequence (e.g., transmitting cell B-1 before transmitting cell B-2).

For a data packet with single cell, buffer and queue management circuit 210 may allocate two cells from both first rank 220 and second rank 230 for either first write port 240 or second write port 250 to write the cell of the single-cell data packet into two memory banks, one in each of first rank 220 and second rank 230, in the same clock cycle. That is, buffer and queue management circuit 210 may direct either first write port 240 or second write port 250 to replicate the cell of the single-cell data packet in both first rank 220 and second rank 230. In the example shown in FIG. 2, a data packet 202 is a single-cell data packet having a single cell A-1 and, thus, cell A-1 is replicated in a memory unit in memory bank 224 in first rank 220 and also in memory bank 234 in second rank 230. When reading the cell of the single-cell data packet 202, either first read port 260 or second read port 270 may read the cell from either first rank 220 or second rank 230, and transmit the cell directly without negatively impacting wire-speed performance.

For a data packet with an odd number of cells of data where the odd number is great than 1 (e.g., three cells, five cells, seven cells and so forth), buffer and queue management circuit 210 may direct either first write port 240 or second write port 250 to write an odd-numbered cell of the data packet into first rank 220, and write an even-numbered cell of the data packet into second rank 230. The last cell of the data packet, an odd-numbered cell, is not replicated. In the example shown in FIG. 2, a data packet 206 has an odd number of cells of data, namely the three cells of data of cell C-1, cell C-2 and cell C-3. Either first write port 240 or second write port 250 may write cell C-1 into a memory unit in memory bank 224 in first rank 220, cell C-2 into a memory unit in memory bank 234 in second rank 230, and cell C-3 into a memory unit in memory bank 226 in first rank 220. Cell C-3 is not replicated in any memory bank of memory units in second rank 230.

Figure 3:
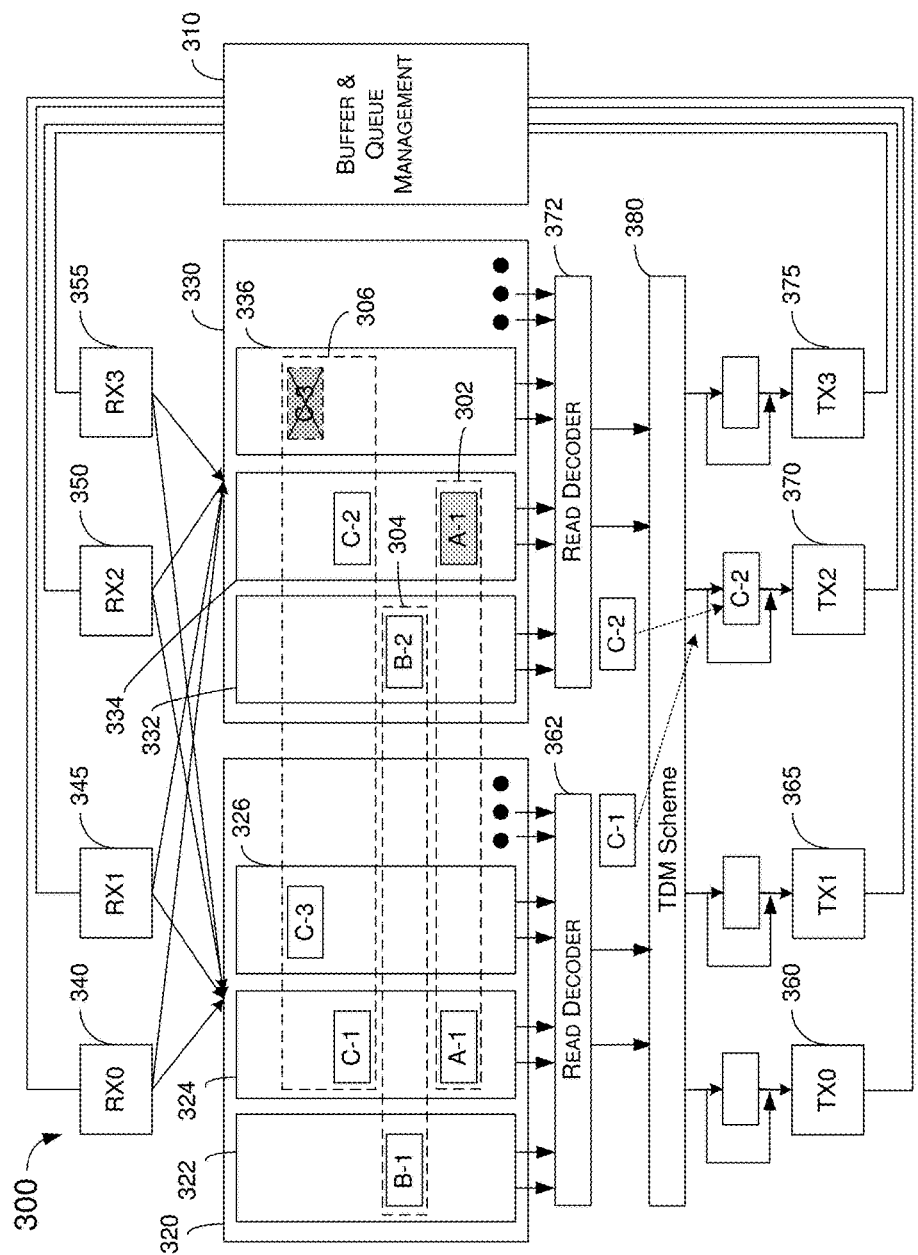
FIG. 3 is a block diagram of an example packet buffer in accordance with another implementation of the present disclosure.

FIG. 3 illustrates an example packet buffer 300 in accordance with another implementation of the present disclosure. Example packet buffer 300 may include a buffer and queue management circuit 310, an odd-numbered rank (first rank) 320 of multiple memory banks of memory units, an even-numbered (second rank) 330 of multiple memory banks of memory units, a first write port (RX0) 340, a second write port (RX1) 345, a third write port (RX2) 350, a fourth write port (RX3) 355, a first read port (TX0) 360, a second read port (TX1) 365, a third read port (TX2) 370, a fourth read port (TX3) 375, an odd-numbered read decoder (first read decoder) 362, and an even-numbered read decoder (second read decoder) 372. Buffer and queue management circuit 310 may be configured to control the operations of first write port 340, second write port 345, third write port 350, fourth write port 355, first read port 360, second read port 365, third read port 370 and fourth read port 375.

First rank 320 of multiple memory banks of memory units may include, for example, at least a first memory bank 322, a second memory bank 324 and a third memory bank 326. Second rank 330 multiple memory banks of memory units may include, for example, at least a first memory bank 332, a second memory bank 334 and a third memory bank 336. Each of the memory banks 322, 324, 326, 332, 334 and 336 may respectively include a number of 1RW memory units (not shown to avoid obscuring FIG. 3), each of which capable of supporting one access operation (e.g., one read operation or one write operation) in a given clock cycle. First read decoder 362 may be associated with first rank 320 to issue two read requests to a memory bank or two memory banks in first rank 320, based on the two cell pointers from first read port 360 and second read port 365, to read two cells of data from two memory units every cell time slot. Likewise, second read decoder 372 may be associated with second rank 330 to issue two read requests to a memory bank or two memory banks in second rank 330, based on the two cell pointers from third read port 370 and fourth read port 375, to read two cells of data from two memory units every cell time slot. Thus, example packet buffer 300 is built with multiple memory banks of 1RW memory units that are arranged or otherwise partitioned into two ranks (e.g., first rank 320 and second rank 330) of multiple memory banks (e.g., first memory bank 322, second memory bank 324, third memory bank 326, first memory bank 332, second memory bank 334 and third memory bank 336).

In example packet buffer 300, first write port 340, second write port 345, third write port 350 and fourth write port 355 may write a cell of a data packet into the odd-numbered rank or first rank 320 first before writing another cell of the data packet into the even-numbered rank or second rank 330. Moreover, first read port 360, second read port 365, third read port 370 and fourth read port 375 may read from the two ranks, first rank 320 and second rank 330, in accordance with a TDM scheme 380.

For each of first write port 340, second write port 345, third write port 350 and fourth write port 355, buffer and queue management circuit 310 may allocate free cells periodically, e.g., by allocating a cell from first rank 320 first and then allocating a cell from second rank 330, for every incoming data packet. A memory bank selection mechanism utilized in example packet buffer 300 may be, for example, to select the memory bank without any read/write port conflict. In writing cells of a data packet, buffer and queue management circuit 310 may direct any of first write port 340, second write port 345, third write port 350 or fourth write port 355 to write an odd-numbered cell of the data packet (e.g., the first cell, the third cell, the fifth cell, the seventh cell and so on) into first rank 320, and write an even-numbered cell of the data packet (e.g., the second cell, the fourth cell, the sixth cell, the eighth cell and so on) into second rank 330. Additionally, buffer and queue management circuit 310 may direct any of first write port 340, second write port 345, third write port 350 or fourth write port 355 to write an odd-numbered cell of a data packet into first rank 320 first before writing an even-numbered cell of the data packet into second rank 330.

First read port 360, second read port 365, third read port 370 and fourth read port 375 may read cells from first rank 320 and second rank 330 separately according to TDM scheme 380. For instance, when first read port 360 and second read port 365 are assigned by buffer and queue management circuit 310 to respectively read cells from first rank 320, third read port 370 and fourth read port 375 may be assigned by buffer and queue management circuit 310 to respectively read cells from second rank 330. Each of read port 360, second read port 365, third read port 370 and fourth read port 375 may be provided with two cell pointers (e.g., one pointed to first rank 320 rank and the other pointed to second rank 330) from buffer and queue management circuit 310 at a time. Each of first read port 360, second read port 365, third read port 370 and fourth read port 375 may issue a read request to first rank 320 or second rank 330, respectively, based on the cell pointer from a respective read port to read a cell for every cell time slot. Each of first read port 360, second read port 365, third read port 370 and fourth read port 375 may then issue a related read request to the rank 320 or 330 currently assigned according to TDM scheme 380. For example, read port 360, second read port 365, third read port 370 or fourth read port 375 may read an even-numbered cell from second rank 330 when such read port is assigned to read the second rank 330 according to TDM scheme 380.

According to TDM scheme 380, each of first read port 360 and second read port 365 may alternately read from first rank 320 and second rank 330 starting with first rank 320, and each of third read port 370 and fourth read port 375 may alternately read from first rank 320 and second rank 330 starting with second rank 330. Alternately, according to TDM scheme 280, each of first read port 360 and second read port 365 may alternately read from first rank 320 and second rank 330 starting with second rank 330, and each of third read port 370 and fourth read port 375 may alternately read from first rank 320 and second rank 330 starting with first rank 320.

In some instances, TDM sequence may not always align with packet sequence (e.g., first rank 320→second rank 330→first rank 320→second rank 330→ . . . ), a read port may perform one-cell reordering in the event that the read port reads an even-numbered cell first before reading an odd-numbered cell of the same packet. In the example shown in FIG. 3, third read port 370 may read a cell C-2 of a data packet 306 (which includes a cell C-1, cell C-2 and a cell C-3) from second rank 330 first. As a result, third read port 370 may buffer cell C-2 until third read port 370 reads cell C-1 from first rank 320 during the next clock cycle so as to transmit the cells in sequence (e.g., transmitting cell C-1 before transmitting cell C-2).

For a data packet with single cell, buffer and queue management circuit 310 may allocate two cells from both first rank 320 and second rank 330 for any of first write port 340, second write port 345, third write port 350 or fourth write port 355 to write the cell of the single-cell data packet into two memory banks, one in each of first rank 320 and second rank 330, in the same clock cycle. That is, buffer and queue management circuit 310 may direct any of first write port 340, second write port 345, third write port 350 or fourth write port 355 to replicate the cell of the single-cell data packet in both first rank 320 and second rank 330. In the example shown in FIG. 3, a data packet 302 is a single-cell data packet having a single cell A-1 and, thus, cell A-1 is replicated in a memory unit in memory bank 324 in first rank 320 and also in memory bank 334 in second rank 330. When reading the cell of the single-cell data packet 302, any of read port 360, second read port 365, third read port 370 or fourth read port 375 may read the cell from either first rank 320 or second rank 330, and transmit the cell directly without negatively impacting wire-speed performance.

For a data packet with an odd number of cells of data where the odd number is great than 1 (e.g., three cells, five cells, seven cells and so forth), buffer and queue management circuit 310 may direct any of first write port 340, second write port 345, third write port 350 or fourth write port 355 to write an odd-numbered cell of the data packet into first rank 320, and write an even-numbered cell of the data packet into second rank 330. The last cell of the data packet, an odd-numbered cell, is not replicated. In the example shown in FIG. 3, a data packet 306 has an odd number of cells of data, namely the three cells of data of cell C-1, cell C-2 and cell C-3. Any of first write port 340, second write port 345, third write port 350 or fourth write port 355 may write cell C-1 into a memory unit in memory bank 324 in first rank 320, cell C-2 into a memory unit in memory bank 334 in second rank 330, and cell C-3 into a memory unit in memory bank 326 in first rank 320. Cell C-3 is not replicated in any memory bank of memory units in second rank 330.

Figure 4:
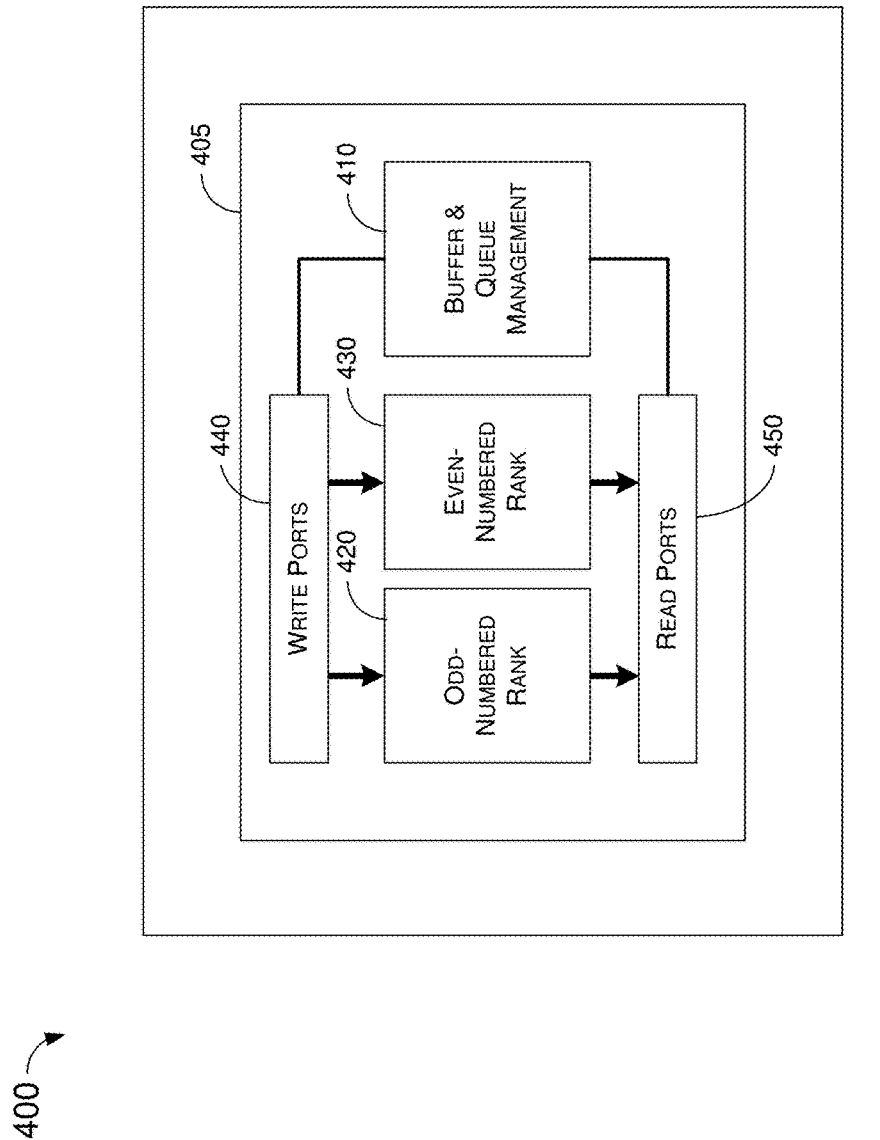
FIG. 4 is a block diagram of an example apparatus in accordance with an implementation of the present disclosure.

FIG. 4 illustrates an example apparatus 400 in accordance with an implementation of the present disclosure. Example apparatus 400 may perform various functions related to techniques, methods and systems described herein, including example process 500 described below. Example apparatus 400 may be implemented as a communication device or a switching device, e.g., a packet switch.

Example apparatus 400 include a packet buffer 405. Packet buffer 405 may include at least those components shown in FIG. 4, such as a buffer and queue management circuit 410, an odd-numbered rank 420 of first banks of 1RW memory units, an even-numbered rank 430 of second banks of 1RW memory units, a number of write ports 440 and a number of read ports 450. Packet buffer 405 may be an implementation of conceptual packet buffer 100, example packet buffer 200 and/or example packet buffer 300. Although buffer and queue management circuit 410, an odd-numbered rank 420 of first banks of memory units, an even-numbered rank 430 of second banks of memory units, a number of write ports 440 and a number of read ports 450 are illustrated as discrete components separate from each other, in various implementations of example apparatus 400 at least some of these components may be integral parts of a single IC, chip or chipset.

Odd-numbered rank 420 may include multiple first banks of memory units, with each memory unit configured to store one cell of data and accommodate one access operation (e.g., one read operation or one write operation) in one clock cycle. Even-numbered rank 430 may include multiple second banks of memory units, with each memory unit configured to store one cell of data and accommodate one access operation (e.g., one read operation or one write operation) in one clock cycle. Write ports 440 may include at least a first write port and a second write port. Read ports 450 may include at least a first read port and a second read port. Buffer and queue management circuit 410 may be configured to manage operations of write ports 440 and read ports 450. For instance, in an event that a data packet to be stored comprises at least two cells of data, buffer and queue management circuit 410 may control write ports 440 to alternately write the at least two cells of the data packet into at least one respective memory unit in the first banks of memory units of odd-numbered rank 420 and at least one respective memory unit in the second banks of memory units of even-numbered rank 430. Moreover, buffer and queue management circuit 410 may also control the read ports 450 to read from the first banks of memory units of odd-numbered rank 420 and from the second banks of memory units of even-numbered rank 430 according to a TDM scheme (e.g., TDM scheme 280 or TDM scheme 380).

In some implementations, buffer and queue management circuit 410 may be configured to control the write ports 440 to write the data packet as a plurality of cells of data including at least one odd-numbered cell and at least one even-numbered cell by performing a number of operations. For instance, write ports 440 may write each odd-numbered cell of the data packet into a respective memory cell of the first banks of memory units of odd-numbered rank 420. Write ports 440 may also write each even-numbered cell of the data packet into a respective memory cell of the second banks of memory units of even-numbered rank 430.

In some implementations, in writing each odd-numbered cell of the data packet into the respective memory cell of the first banks of memory units of odd-numbered rank 420 and in writing each even-numbered cell of the data packet into the respective memory cell of the second banks of memory units of even-numbered rank 430, buffer and queue management circuit 410 may be configured to control write ports 440 to write an odd-numbered cell of the data packet into a respective memory cell of the first banks of memory units of odd-numbered rank 420 before writing an even-numbered cell of the data packet into a respective memory cell of the second banks of memory units of even-numbered rank 430.

In some implementations, in reading from the first banks of memory units of odd-numbered rank 420 and the second banks of memory units of even-numbered rank 430 according to a TDM scheme, buffer and queue management circuit 410 may be configured to perform a number of operations. For instance, buffer and queue management circuit 410 may assign a first read port of read ports 450 to alternately read the first banks and the second banks of memory units starting from a respective memory unit of the first banks of memory units. Buffer and queue management circuit 410 may also assign a second read port of read ports 450 to alternately read the first banks and the second banks of memory units starting from a respective memory unit of the second banks of memory units.

In some implementations, in assigning the first read port to alternately read the first banks and the second banks of memory units, buffer and queue management circuit 410 may be configured to provide the first read port with a first pointer pointed to the first banks of memory units and a second pointer pointed to the second banks of memory units. Additionally, in assigning the second read port to alternately read the first banks and the second banks of memory units, buffer and queue management circuit 410 may be configured to provide the second read port with a third pointer pointed to the first banks of memory units and a fourth pointer pointed to the second banks of memory units.

In some implementations, in reading from the first banks of memory units and the second banks of memory units according to a TDM scheme, buffer and queue management circuit 410 may be configured to control read ports 450 to perform a number of operations. For instance, in an event that a data packet to be read includes at least two cells of data, buffer and queue management circuit 410 may control read ports 450 to read an even-numbered cell of data in a first clock cycle, read an odd-numbered cell of data in a second clock cycle after the first clock cycle, and control read ports 450 to perform one-cell reordering to output the odd-numbered cell and the even-numbered cell in sequence.

In some implementations, in performing the one-cell reordering, read ports 450 may be configured to perform a number of operations. For instance, at least one read port of read ports 450 may buffer the even-numbered cell of data, transmit the odd-numbered cell of data in a third clock cycle, and transmit the even-numbered cell of data in a fourth clock cycle after the third clock cycle.

In some implementations, in reading from the first banks of memory units and the second banks of memory units according to a TDM scheme, buffer and queue management circuit 410 may be configured to perform a number of operations. For example, buffer and queue management circuit 410 may assign a first read port of read ports 450 to alternately read the first banks and the second banks of memory units starting from a respective memory unit of the first banks of memory units. Buffer and queue management circuit 410 may assign a second read port of read ports 450 to alternately read the first banks and the second banks of memory units starting from a respective memory unit of the first banks of memory units. Buffer and queue management circuit 410 may assign a third read port of read ports 450 to alternately read the first banks and the second banks of memory units starting from a respective memory unit of the second banks of memory units. Buffer and queue management circuit 410 may assign a fourth read port of read ports 450 to alternately read the first banks and the second banks of memory units starting from a respective memory unit of the second banks of memory units.

In some implementations, in assigning the first read port to alternately read the first banks and the second banks of memory units, buffer and queue management circuit 410 may be configured to provide the first read port with a first pointer pointed to the first banks of memory units and a second pointer pointed to the second banks of memory units. In assigning the second read port to alternately read the first banks and the second banks of memory units, buffer and queue management circuit 410 may be configured to provide the second read port with a third pointer pointed to the first banks of memory units and a fourth pointer pointed to the second banks of memory units. In assigning the third read port to alternately read the first banks and the second banks of memory units, buffer and queue management circuit 410 may be configured to provide the third read port with a fifth pointer pointed to the first banks of memory units and a sixth pointer pointed to the second banks of memory units. In assigning the fourth read port to alternately read the first banks and the second banks of memory units, buffer and queue management circuit 410 may be configured to provide the fourth read port with a seventh pointer pointed to the first banks of memory units and an eighth pointer pointed to the second banks of memory units.

In some implementations, in an event that the data packet includes no more than one cell of data, buffer and queue management circuit 410 may be further configured to control write ports 440 to write the data packet as one cell of data into a first memory cell of the first banks of memory units and into a second memory cell of the second banks of memory units.

In some implementations, in writing the data packet as one cell into the first memory cell of the first banks of memory units and into the second memory cell of the second banks of memory units, write ports 440 may be configured to write the data packet into the respective memory cell of the first banks of memory units and into the respective memory cell of the second banks of memory units in one clock cycle.

In some implementations, buffer and queue management circuit 410 may be further configured to control read ports 450 to perform a number of operations. For instance, buffer and queue management circuit 410 may control read ports 450 to read the one cell of data of the data packet which includes no more than one cell of data from either the first memory unit or the second memory unit, and transmit the data packet.

Figure 5:
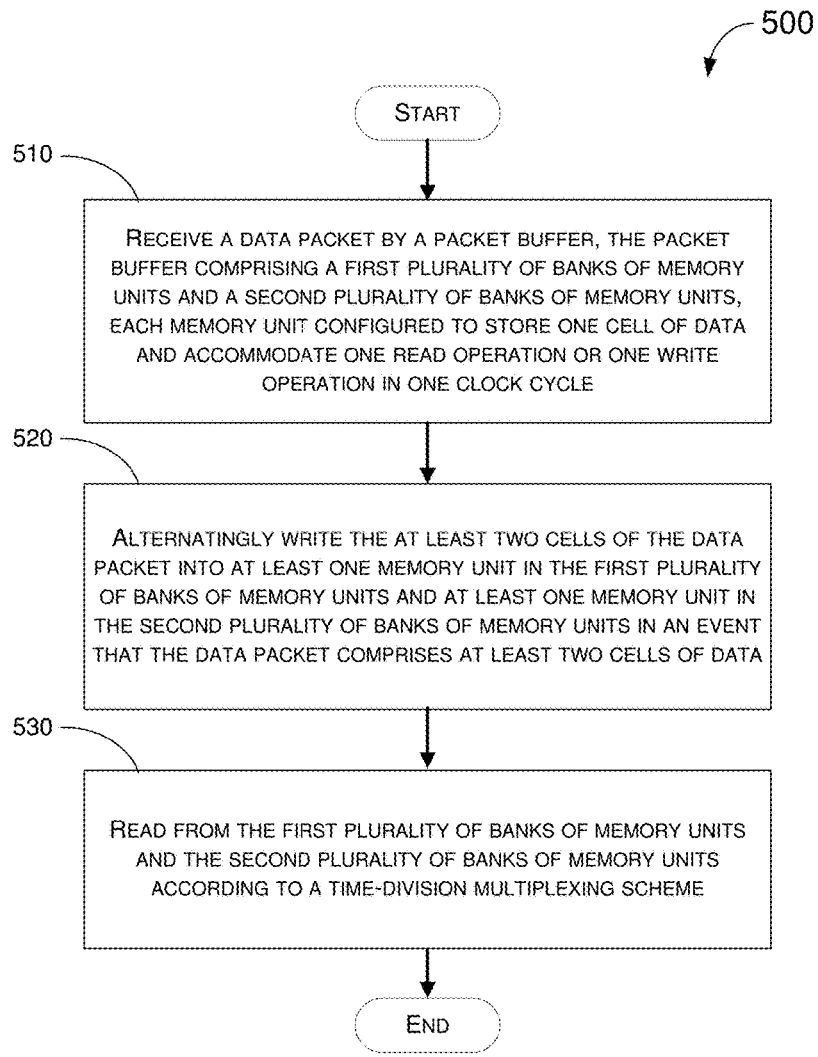
FIG. 5 is a flowchart of an example process in accordance with an implementation of the present disclosure.
Figure 6:
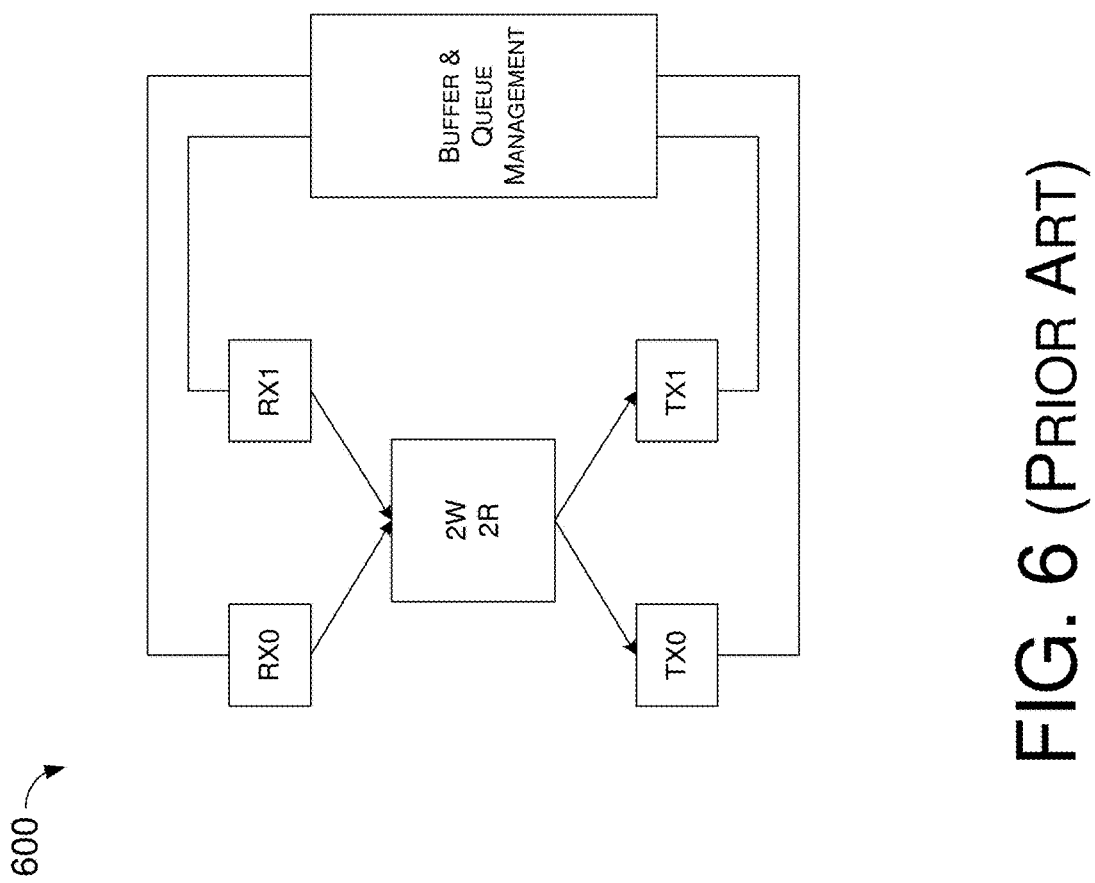
FIG. 6 is a block diagram of a conventional packet buffer.
Figure 7:
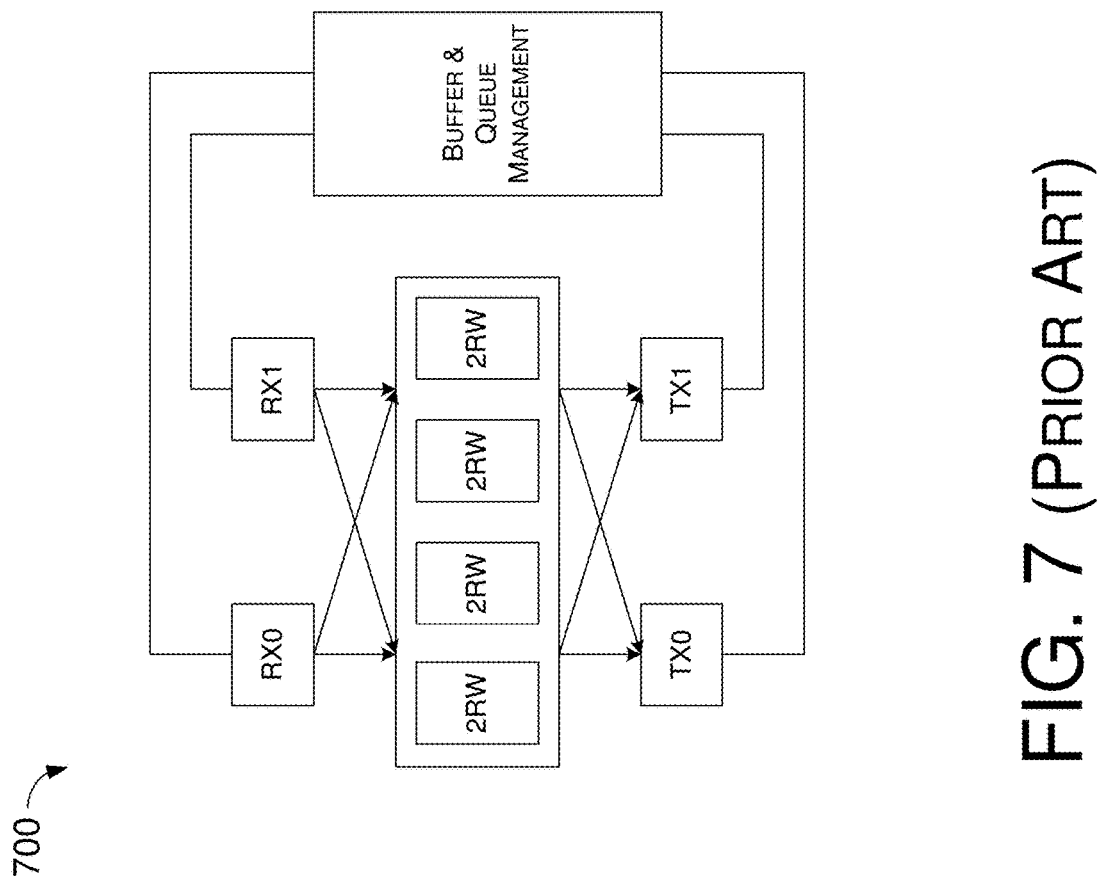
FIG. 7 is a block diagram of another conventional packet buffer.

FIG. 5 illustrates an example process 500 in accordance with an implementation of the present disclosure. Example process 500 may represent an aspect of implementing features of conceptual packet buffer 100, example packet buffer 200, example packet buffer 300 and/or packet buffer 405 of example apparatus 400. Example process 500 may include one or more operations, actions, or functions as illustrated by one or more of blocks 510, 520 and 530. Although illustrated as discrete blocks, various blocks may be divided into additional blocks, combined into fewer blocks, or eliminated, depending on the desired implementation. Example process 500 may be implemented by packet buffer 405 of example apparatus 400. Solely for illustrative purposes, the operations of example process 500 are described below in the context of example process 500 being performed by packet buffer 405 of example apparatus 400. Example process 500 may begin at block 510.

Block 510 may refer to packet buffer 405 receiving a data packet. The packet buffer may include a first plurality of banks of memory units and a second plurality of banks of memory units. Each memory unit may be a 1RW memory unit configured to store one cell of data and accommodate one access operation (e.g., one read operation or one write operation) in one clock cycle. Block 510 may be followed by block 520.

Block 520 may refer to packet buffer 405 alternately writing the at least two cells of the data packet into at least one memory unit in the first plurality of banks of memory units and at least one memory unit in the second plurality of banks of memory units, in an event that the data packet includes at least two cells of data. Block 520 may be followed by block 530.

Block 530 may refer to packet buffer 405 reading from the first plurality of banks of memory units and the second plurality of banks of memory units according to a TDM scheme.

In some implementations, in alternately writing, example process 500 may involve packet buffer 405 writing the data packet as a plurality of cells of data comprising at least one odd-numbered cell and at least one even-numbered cell by performing a number of operations. For instance, example process 500 may involve packet buffer 405 writing each odd-numbered cell of the data packet into a respective memory cell of the first plurality of banks of memory units. Example process 500 may also involve packet buffer 405 writing each even-numbered cell of the data packet into a respective memory cell of the second plurality of banks of memory units.

In some implementations, in writing each odd-numbered cell of the data packet into the respective memory cell of the first plurality of banks of memory units and writing each even-numbered cell of the data packet into the respective memory cell of the second plurality of banks of memory units, example process 500 may involve packet buffer 405 writing an odd-numbered cell of the data packet into a respective memory cell of the first plurality of banks of memory units before writing an even-numbered cell of the data packet into a respective memory cell of the second plurality of banks of memory units.

In some implementations, in reading from the first plurality of banks of memory units and the second plurality of banks of memory units according to a TDM scheme, example process 500 may involve packet buffer 405 assigning a first read port to alternately read the first plurality and the second plurality of banks of memory units starting from a respective memory unit of the first plurality of banks of memory units. Example process 500 may involve packet buffer 405 assigning a second read port to alternately read the first plurality and the second plurality of banks of memory units starting from a respective memory unit of the second plurality of banks of memory units.

In some implementations, in reading from the first plurality of banks of memory units and the second plurality of banks of memory units according to a TDM scheme, example process 500 may involve packet buffer 405 performing a number of operations in an event that a data packet to be read comprises at least two cells of data. For instance, example process 500 may involve packet buffer 405 reading an even-numbered cell of data in a first clock cycle, reading an odd-numbered cell of data in a second clock cycle after the first clock cycle, and performing one-cell reordering to output the odd-numbered cell and the even-numbered cell in sequence.

In some implementations, in performing of the one-cell reordering, example process 500 may involve packet buffer 405 buffering the even-numbered cell of data, transmitting the odd-numbered cell of data in a third clock cycle, and transmitting the even-numbered cell of data in a fourth clock cycle after the third clock cycle.

In some implementations, in reading from the first plurality of banks of memory units and the second plurality of banks of memory units according to a TDM scheme, example process 500 may involve packet buffer 405 assigning a first read port to alternately read the first plurality and the second plurality of banks of memory units starting from a respective memory unit of the first plurality of banks of memory units. Example process 500 may involve packet buffer 405 assigning a second read port to alternately read the first plurality and the second plurality of banks of memory units starting from a respective memory unit of the first plurality of banks of memory units. Example process 500 may also involve packet buffer 405 assigning a third read port to alternately read the first plurality and the second plurality of banks of memory units starting from a respective memory unit of the second plurality of banks of memory units. Example process 500 may further involve packet buffer 405 assigning a fourth read port to alternately read the first plurality and the second plurality of banks of memory units starting from a respective memory unit of the second plurality of banks of memory units.

In some implementations, example process 500 may further involve packet buffer 405 writing the data packet as one cell of data into a first memory cell of the first plurality of banks of memory units and into a second memory cell of the second plurality of banks of memory units, in an event that the data packet includes no more than one cell of data.

In some implementations, in writing the data packet as one cell into the first memory cell of the first plurality of banks of memory units and into the second memory cell of the second plurality of banks of memory units, example process 500 may further involve packet buffer 405 writing the data packet into the respective memory cell of the first plurality of banks of memory units and into the respective memory cell of the second plurality of banks of memory units in one clock cycle.

In some implementations, example process 500 may further involve packet buffer 405 reading the one cell of data of the data packet which comprises no more than one cell of data from either the first memory unit or the second memory unit, and transmitting the data packet.

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving a data packet by a packet buffer, the packet buffer comprising a first plurality of banks of memory units and a second plurality of banks of memory units, each memory unit configured to store one cell of data and accommodate one access operation in one clock cycle;
in an event that the data packet comprises at least two cells of data, alternately writing the at least two cells of the data packet into at least one memory unit in the first plurality of banks of memory units and at least one memory unit in the second plurality of banks of memory units; and
reading from the first plurality of banks of memory units and the second plurality of banks of memory units according to a time-division multiplexing (TDM) scheme.

2. The method of claim 1, wherein the alternately writing comprises:
writing the data packet as a plurality of cells of data comprising at least one odd-numbered cell and at least one even-numbered cell by performing operations comprising:
writing each odd-numbered cell of the data packet into a respective memory cell of the first plurality of banks of memory units; and
writing each even-numbered cell of the data packet into a respective memory cell of the second plurality of banks of memory units.

3. The method of claim 2, wherein the writing of each odd-numbered cell of the data packet into the respective memory cell of the first plurality of banks of memory units and the writing of each even-numbered cell of the data packet into the respective memory cell of the second plurality of banks of memory units comprises writing an odd-numbered cell of the data packet into a respective memory cell of the first plurality of banks of memory units before writing an even-numbered cell of the data packet into a respective memory cell of the second plurality of banks of memory units.

4. The method of claim 1, wherein the reading from the first plurality of banks of memory units and the second plurality of banks of memory units according to the TDM scheme comprises:
assigning a first read port to alternately read the first plurality and the second plurality of banks of memory units starting from a respective memory unit of the first plurality of banks of memory units; and
assigning a second read port to alternately read the first plurality and the second plurality of banks of memory units starting from a respective memory unit of the second plurality of banks of memory units.

5. The method of claim 1, wherein the reading from the first plurality of banks of memory units and the second plurality of banks of memory units according to the TDM scheme comprises:
in an event that a data packet to be read comprises at least two cells of data, performing operations comprising:

reading an even-numbered cell of data in a first clock cycle;
reading an odd-numbered cell of data in a second clock cycle after the first clock cycle; and
performing one-cell reordering to output the odd-numbered cell and the even-numbered cell in sequence.

6. The method of claim 1, wherein the reading from the first plurality of banks of memory units and the second plurality of banks of memory units according to the TDM scheme comprises:
assigning a first read port to alternately read the first plurality and the second plurality of banks of memory units starting from a respective memory unit of the first plurality of banks of memory units;
assigning a second read port to alternately read the first plurality and the second plurality of banks of memory units starting from a respective memory unit of the first plurality of banks of memory units;
assigning a third read port to alternately read the first plurality and the second plurality of banks of memory units starting from a respective memory unit of the second plurality of banks of memory units; and
assigning a fourth read port to alternately read the first plurality and the second plurality of banks of memory units starting from a respective memory unit of the second plurality of banks of memory units.

7. The method of claim 1, further comprising:
in an event that the data packet comprises no more than one cell of data, writing the data packet as one cell of data into a first memory cell of the first plurality of banks of memory units and into a second memory cell of the second plurality of banks of memory units.

8. An apparatus, comprising:
a packet buffer comprising:
a first plurality of banks of memory units, each memory unit of the first plurality of banks configured to store one cell of data and accommodate one access operation in one clock cycle;
a second plurality of banks of memory units, each memory unit of the second plurality of banks configured to store one cell of data and accommodate one access operation in one clock cycle;
a plurality of write ports;
a plurality of read ports; and
a management circuit configured to manage operations of the plurality of write ports and the plurality of read ports,
wherein the management circuit is configured to control the plurality of write ports to alternately write at least two cells of a data packet into at least one respective memory unit in the first plurality of banks of memory units and at least one respective memory unit in the second plurality of banks of memory units.

9. The apparatus of claim 8, wherein the management circuit is configured to control the plurality of read ports to read from the first plurality of banks of memory units and the second plurality of banks of memory units according to a time-division multiplexing (TDM) scheme.

10. The apparatus of claim 8, wherein the management circuit is configured to control the plurality of write ports to write the data packet as a plurality of cells of data comprising at least one odd-numbered cell and at least one even-numbered cell by performing operations comprising:
writing each odd-numbered cell of the data packet into a respective memory cell of the first plurality of banks of memory units; and
writing each even-numbered cell of the data packet into a respective memory cell of the second plurality of banks of memory units.

11. The apparatus of claim 10, wherein, in writing each odd-numbered cell of the data packet into the respective memory cell of the first plurality of banks of memory units and in writing each even-numbered cell of the data packet into the respective memory cell of the second plurality of banks of memory units, the management circuit is configured to control the plurality of write ports to write an odd-numbered cell of the data packet into a respective memory cell of the first plurality of banks of memory units before writing an even-numbered cell of the data packet into a respective memory cell of the second plurality of banks of memory units.

12. The apparatus of claim 8, wherein, in reading from the first plurality of banks of memory units and the second plurality of banks of memory units according to a time-division multiplexing (TDM) scheme, the management circuit is configured to perform operations comprising:
assigning a first read port of the plurality of read ports to alternately read the first plurality and the second plurality of banks of memory units starting from a respective memory unit of the first plurality of banks of memory units; and
assigning a second read port of the plurality of read ports to alternately read the first plurality and the second plurality of banks of memory units starting from a respective memory unit of the second plurality of banks of memory units.

13. The apparatus of claim 12, wherein, in assigning the first read port to alternately read the first plurality and the second plurality of banks of memory units, the management circuit is configured to provide the first read port with a first pointer pointed to the first plurality of banks of memory units and a second pointer pointed to the second plurality of banks of memory units, and where, in assigning the second read port to alternately read the first plurality and the second plurality of banks of memory units, the management circuit is configured to provide the second read port with a third pointer pointed to the first plurality of banks of memory units and a fourth pointer pointed to the second plurality of banks of memory units.

14. The apparatus of claim 8, wherein, in reading from the first plurality of banks of memory units and the second plurality of banks of memory units according to a time-division multiplexing (TDM) scheme, the management circuit is configured to control the plurality of read ports to perform operations comprising:
in an event that a data packet to be read comprises at least two cells of data, performing operations comprising:
reading an even-numbered cell of data in a first clock cycle;
reading an odd-numbered cell of data in a second clock cycle after the first clock cycle; and
performing one-cell reordering to output the odd-numbered cell and the even-numbered cell in sequence.

15. The apparatus of claim 14, wherein, in performing the one-cell reordering, the plurality of read ports are configured to perform operations comprising:
buffering the even-numbered cell of data;
transmitting the odd-numbered cell of data in a third clock cycle; and
transmitting the even-numbered cell of data in a fourth clock cycle after the third clock cycle.

16. The apparatus of claim 8, wherein, in reading from the first plurality of banks of memory units and the second plurality of banks of memory units according to a time-division multiplexing (TDM) scheme, the management circuit is configured to perform operations comprising:

assigning a first read port of the plurality of read ports to alternately read the first plurality and the second plurality of banks of memory units starting from a respective memory unit of the first plurality of banks of memory units;

assigning a second read port of the plurality of read ports to alternately read the first plurality and the second plurality of banks of memory units starting from a respective memory unit of the first plurality of banks of memory units;

assigning a third read port of the plurality of read ports to alternately read the first plurality and the second plurality of banks of memory units starting from a respective memory unit of the second plurality of banks of memory units; and assigning a fourth read port of the plurality of read ports to alternately read the first plurality and the second plurality of banks of memory units starting from a respective memory unit of the second plurality of banks of memory units.

17. The apparatus of claim 16, wherein, in assigning the first read port to alternately read the first plurality and the second plurality of banks of memory units, the management circuit is configured to provide the first read port with a first pointer pointed to the first plurality of banks of memory units and a second pointer pointed to the second plurality of banks of memory units, wherein, in assigning the second read port to alternately read the first plurality and the second plurality of banks of memory units, the management circuit is configured to provide the second read port with a third pointer pointed to the first plurality of banks of memory units and a fourth pointer pointed to the second plurality of banks of memory units, where, in assigning the third read port to alternately read the first plurality and the second plurality of banks of memory units, the management circuit is configured to provide the third read port with a fifth pointer pointed to the first plurality of banks of memory units and a sixth pointer pointed to the second plurality of banks of memory units, and where, in assigning the fourth read port to alternately read the first plurality and the second plurality of banks of memory units, the management circuit is configured to provide the fourth read port with a seventh pointer pointed to the first plurality of banks of memory units and an eighth pointer pointed to the second plurality of banks of memory units.

18. The apparatus of claim 8, wherein, in an event that the data packet comprises no more than one cell of data, the management circuit is further configured to control the plurality of write ports to write the data packet as one cell of data into a first memory cell of the first plurality of banks of memory units and into a second memory cell of the second plurality of banks of memory units.

19. The apparatus of claim 18, wherein, in writing the data packet as one cell into the first memory cell of the first plurality of banks of memory units and into the second memory cell of the second plurality of banks of memory units, the plurality of write ports are configured to write the data packet into the respective memory cell of the first plurality of banks of memory units and into the respective memory cell of the second plurality of banks of memory units in one clock cycle.

20. The apparatus of claim 18, wherein the management circuit is further configured to control the plurality of read ports to perform operations comprising:

reading the one cell of data of the data packet which comprises no more than one cell of data from either the first memory unit or the second memory unit; and transmitting the data packet.

\* \* \* \* \*